(12) United States Patent
Suzuki et al.

(10) Patent No.: US 8,929,595 B2
(45) Date of Patent: Jan. 6, 2015

(54) DICTIONARY CREATION USING IMAGE SIMILARITY

(75) Inventors: Takashi Suzuki, Kawasaki (JP); Kiyotaka Takahashi, Tokyo (JP); Kotaro Yano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 250 days.

(21) Appl. No.: 13/459,021

(22) Filed: Apr. 27, 2012

(65) Prior Publication Data

US 2012/0288148 A1    Nov. 15, 2012

(30) Foreign Application Priority Data

May 10, 2011    (JP) .................................. 2011-105656

(51) Int. Cl.
*G06K 9/00* (2006.01)
*G06K 9/62* (2006.01)

(52) U.S. Cl.
CPC .......... *G06K 9/00281* (2013.01); *G06K 9/6255* (2013.01)
USPC ....................................... 382/103

(58) Field of Classification Search
None
See application file for complete search history.

(56) References Cited

U.S. PATENT DOCUMENTS

| | | | |
|---|---|---|---|
| 5,754,685 A | 5/1998 | Takahashi et al. | |
| 7,699,423 B2 | 4/2010 | Suwa et al. | |
| 7,912,253 B2 | 3/2011 | Suzuki et al. | |
| 7,995,805 B2 | 8/2011 | Suzuki et al. | |
| 2006/0115157 A1 | 6/2006 | Mori et al. | |
| 2009/0041312 A1* | 2/2009 | Wakasugi | 382/118 |
| 2009/0089235 A1 | 4/2009 | Torii et al. | |
| 2009/0324060 A1 | 12/2009 | Sato et al. | |
| 2010/0205177 A1* | 8/2010 | Sato et al. | 707/737 |
| 2011/0158540 A1 | 6/2011 | Suzuki et al. | |
| 2012/0051646 A1 | 3/2012 | Suzuki et al. | |
| 2012/0063639 A1 | 3/2012 | Yano | |
| 2012/0092495 A1 | 4/2012 | Yano | |

FOREIGN PATENT DOCUMENTS

| | | |
|---|---|---|
| JP | 2007-249588 A | 9/2007 |
| JP | 2009-258991 A | 11/2009 |

OTHER PUBLICATIONS

U.S. Appl. No. 13/446,898, filed Apr. 13, 2012, Applicant: Yano, et al.
U. S. Appl. No. 13/461,585, filed May 1, 2012, Applicant: Yano.

* cited by examiner

*Primary Examiner* — Atiba O Fitzpatrick
(74) *Attorney, Agent, or Firm* — Fitzpatrick, Cella, Harper & Scinto

(57) ABSTRACT

An image recognition apparatus comprising: an obtaining unit configured to obtain one or more images; a detection unit configured to detect a target object image from each of one or more images; a cutting unit configured to cut out one or more local regions from the target object image; a feature amount calculation unit configured to calculate a feature amount from each of one or more local regions to recognize the target object; a similarity calculation unit configured to calculate, for each of one or more local regions, a similarity between the feature amounts; and a registration unit configured to, if there is a pair of feature amounts whose similarity is not less than a threshold, register, for each of one or more regions, one of the feature amounts as dictionary data for the target object.

6 Claims, 7 Drawing Sheets

FACE IMAGE    LOCAL REGION

◯ ENDPOINT

EYE LOCAL FEATURE DISTRIBUTION

FIG. 6
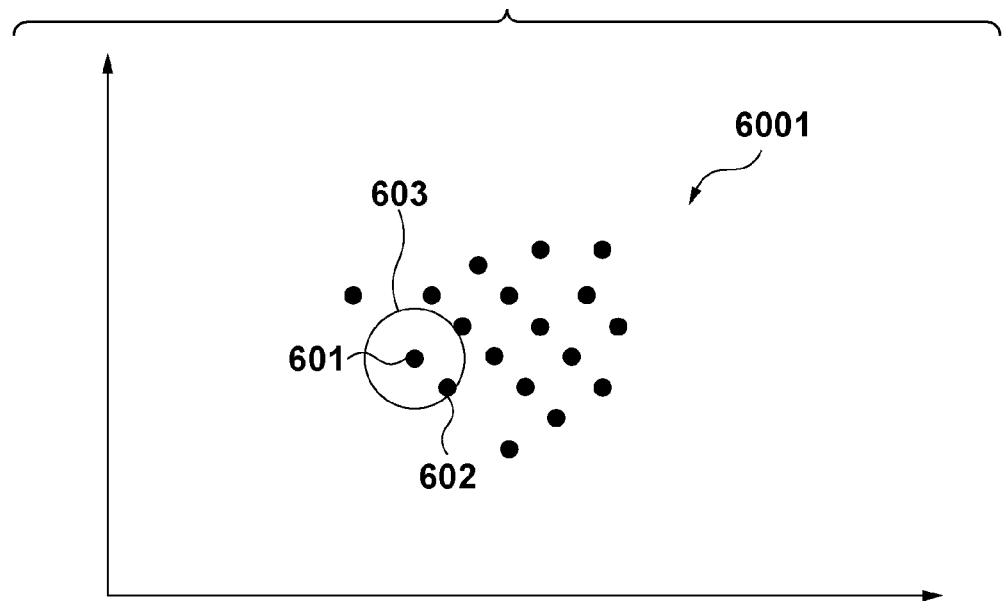
EYE LOCAL FEATURE DISTRIBUTION (BEFORE LOCAL FEATURE SELECTION)
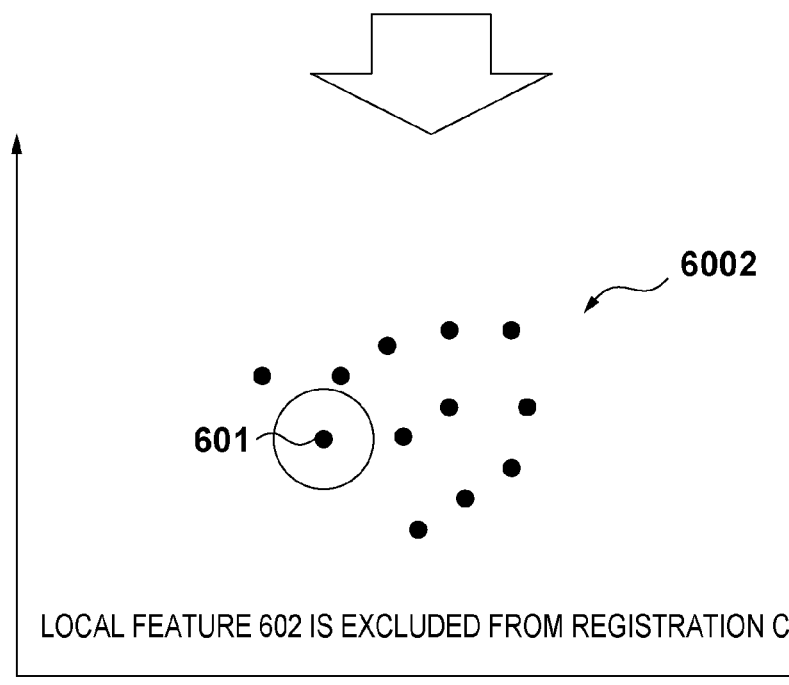
LOCAL FEATURE 602 IS EXCLUDED FROM REGISTRATION CANDIDATES
EYE LOCAL FEATURE DISTRIBUTION (AFTER LOCAL FEATURE SELECTION)

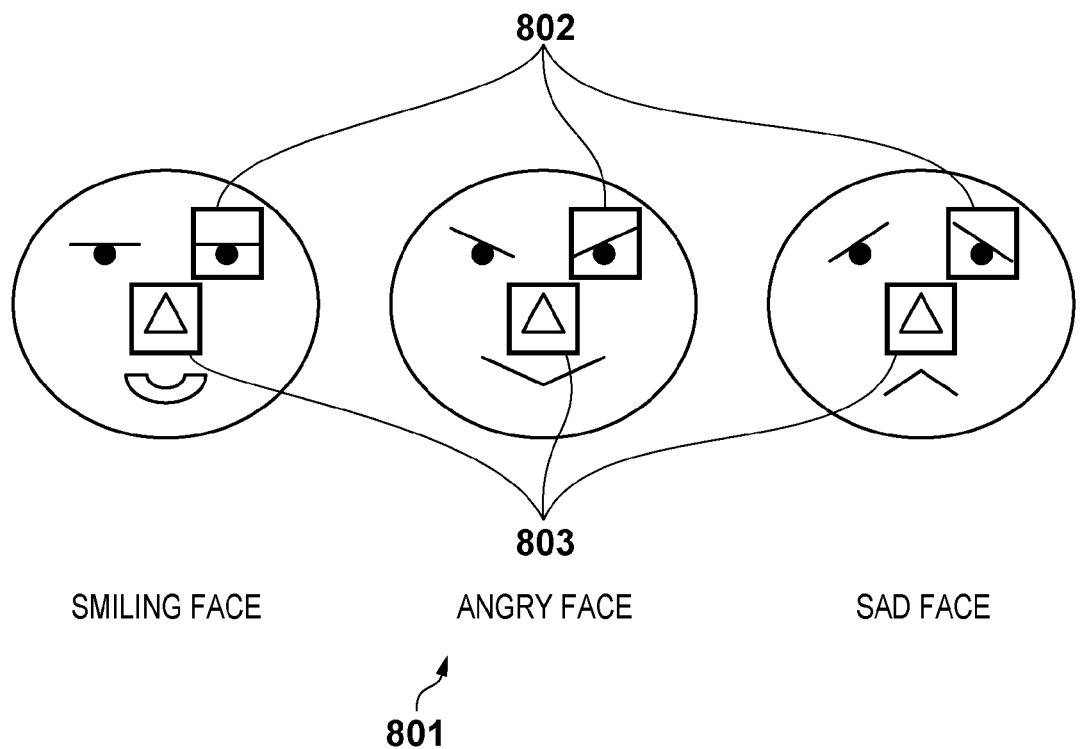

DICTIONARY CREATION USING IMAGE SIMILARITY

BACKGROUND OF THE INVENTION

1. Field of the Invention

The present invention relates to an image recognition apparatus for recognizing whether an input image is an image of a predetermined category, a method of controlling the image recognition apparatus, and a storage medium.

2. Description of the Related Art

There is conventionally known a face recognition technique that extracts a face region from an image including a human face and compares the extracted face image with the face image of a specific person registered in advance, thereby performing personal recognition. This technique is used for a security purpose to, for example, permit entry to an office when a person captured by a camera is authenticated as a registered person. There is also a demand for using this technique to search for photos including identical persons. For the security purpose, the technique allows highly accurate recognition by imposing restrictions on conditions for capturing a person. In the latter case, however, the person capturing conditions are wide-ranging, resulting in a lower recognition accuracy. For example, identical persons may erroneously be determined as different persons if the face orientation, expression, and illumination at the time of photographing change between photos.

A method has been proposed to solve this problem, in which recognition is performed by registering a plurality of face images captured under various conditions. Japanese Patent Laid-Open No. 2007-249588 discloses a method of improving the recognition accuracy by registering faces in various states such as a face turned upward, a face with a beard, and a face with the mouth open from an input moving image. Japanese Patent Laid-Open No. 2009-258991 discloses a method of improving the recognition accuracy by registering a plurality of face images with different face orientations.

However, combining the conditions such as the face orientation, expression, and illumination increases the number of face images to be registered. In addition, the processing amount also increases because collation with a lot of face images needs to be done in recognition processing.

SUMMARY OF THE INVENTION

The present invention has been made in consideration of the above-described problems and provides an image recognition apparatus and method that enable highly accurate recognition even when the registered data amount is small.

According to one aspect of the present invention, there is provided an image recognition apparatus for recognizing a target object in an image by collation with dictionary data, comprising: an obtaining unit configured to obtain one or a plurality of images; a detection unit configured to detect a target object image from each of one or the plurality of images; a cutting unit configured to cut out one or a plurality of local regions from the target object image; a feature amount calculation unit configured to calculate, for each of one or the plurality of images, a feature amount from each of one or the plurality of local regions to recognize the target object; a similarity calculation unit configured to calculate, for each of one or the plurality of local regions, a similarity between the feature amounts calculated for each of one or the plurality of images; and a registration unit configured to, if there is a pair of feature amounts whose similarity is not less than a threshold, register, for each of one or the plurality of regions, one of the feature amounts as dictionary data for the target object.

According to one aspect of the present invention, there is provided a method of controlling an image recognition apparatus for recognizing a target object in an image by collation with dictionary data, comprising: obtaining one or a plurality of images; detecting a target object image from each of one or the plurality of images; cutting out one or a plurality of local regions from one or the plurality of target object image; calculating, for each of one or the plurality of images, a feature amount from each of one or the plurality of regions to recognize the target object; calculating, for each of one or the plurality of regions, a similarity between the feature amounts calculated for respective one or the plurality of images; and if there is a pair of feature amounts whose similarity is not less than a threshold, registering, for each of one or the plurality of regions, one of the feature amounts as dictionary data for the target object.

Further features of the present invention will be apparent from the following description of exemplary embodiments with reference to the attached drawings.

BRIEF DESCRIPTION OF THE DRAWINGS

FIG. 6 shows views for explaining local feature selection;

FIG. 8 is a view showing an example of an image group to be registered; and

FIG. 9 is a table for explaining dictionary data to be recorded.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

(First Embodiment)

An image recognition apparatus according to this embodiment, which recognizes a target object from an image by collation with dictionary data, will now be described in detail with reference to the accompanying drawings.

In this embodiment, a case will be explained in which a personal face image is input from a moving image to create dictionary data. Note that the present invention is applicable not only to a person but also a dog or another target object.

Figure 1:
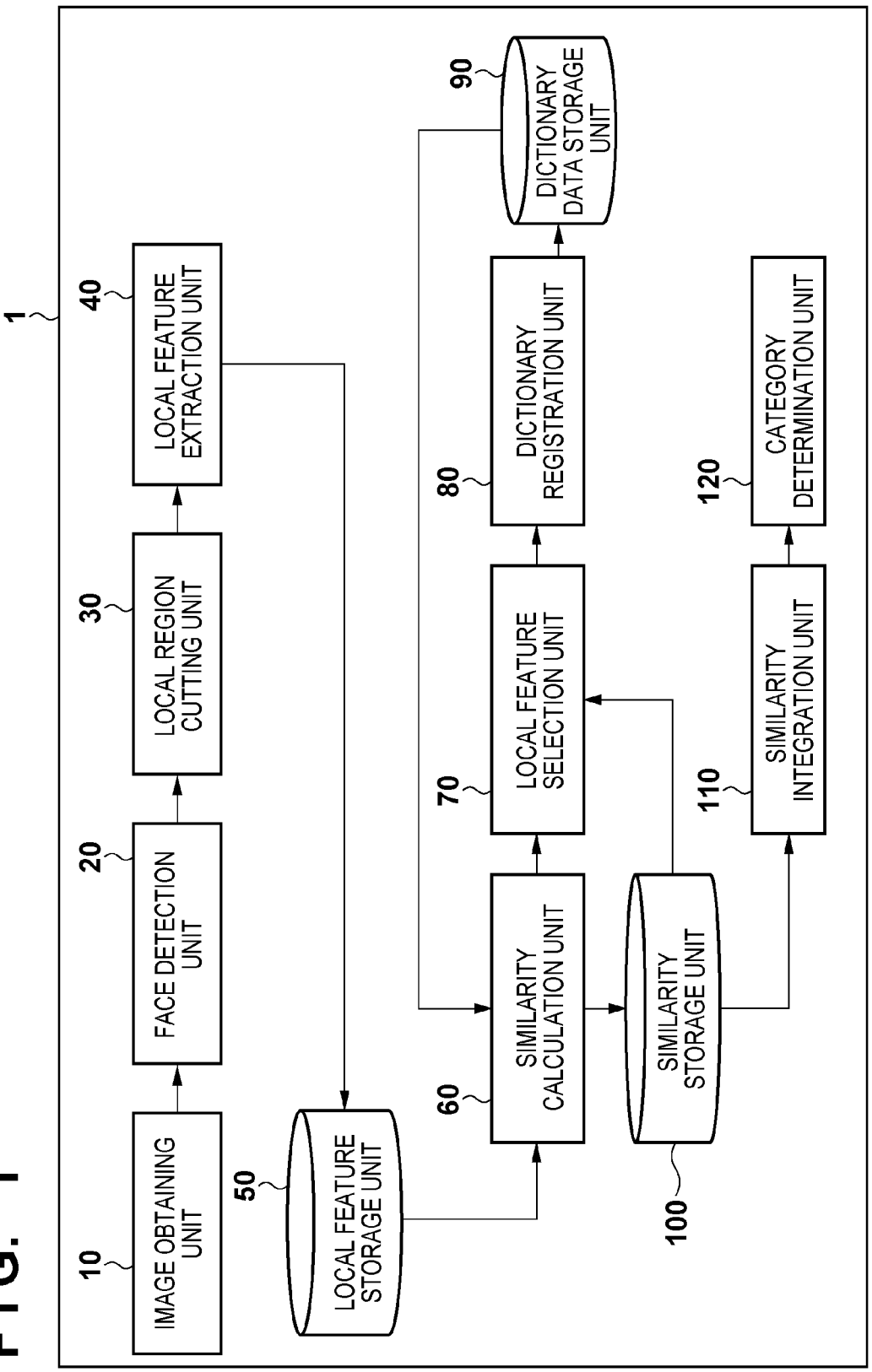
FIG. 1 is a block diagram showing the functional arrangement of an image recognition apparatus.

FIG. 1 shows the functional arrangement of an image recognition apparatus 1 according to this embodiment. The image recognition apparatus 1 includes an image obtaining unit 10, a face detection unit 20, a local region cutting unit 30, a local feature extraction unit 40, a local feature storage unit 50, a similarity calculation unit 60, a local feature selection unit 70, a dictionary registration unit 80, a dictionary data storage unit 90, a similarity storage unit 100, a similarity integration unit 110, and a category determination unit 120.

The image obtaining unit 10 obtains image data captured by an image capturing unit such as a camera. The face detection unit 20 detects a face region image from the image data obtained by the image obtaining unit 10. The local region cutting unit 30 cuts out a local region image from the face region detected by the face detection unit 20.

The local feature extraction unit 40 calculates a feature amount to be used to recognize the face from the local region image cut out by the local region cutting unit 30, and stores the feature amount in the local feature storage unit 50. The local feature storage unit 50 stores the feature amount calculated by the local feature extraction unit 40. The similarity calculation unit 60 calculates the similarities between local features calculated by the local feature extraction unit 40 and stored in the local feature storage unit 50, and stores the similarities in the similarity storage unit 100. The similarity storage unit 100 also calculates the similarities between the local features stored in the local feature storage unit 50 and those registered in the dictionary data storage unit 90.

The local feature selection unit 70 selects a necessary number of local features out of those stored in the local feature storage unit 50 as registration targets based on the similarities stored in the similarity storage unit 100. The dictionary registration unit 80 registers, in the dictionary data storage unit 90, the local features selected by the local feature selection unit 70.

The similarity integration unit 110 calculates the similarity between the input image and the dictionary data based on the similarities of the local features stored in the similarity storage unit 100. The category determination unit 120 determines the category of the input image based on the similarity calculated by the similarity integration unit 110.

Figure 2:
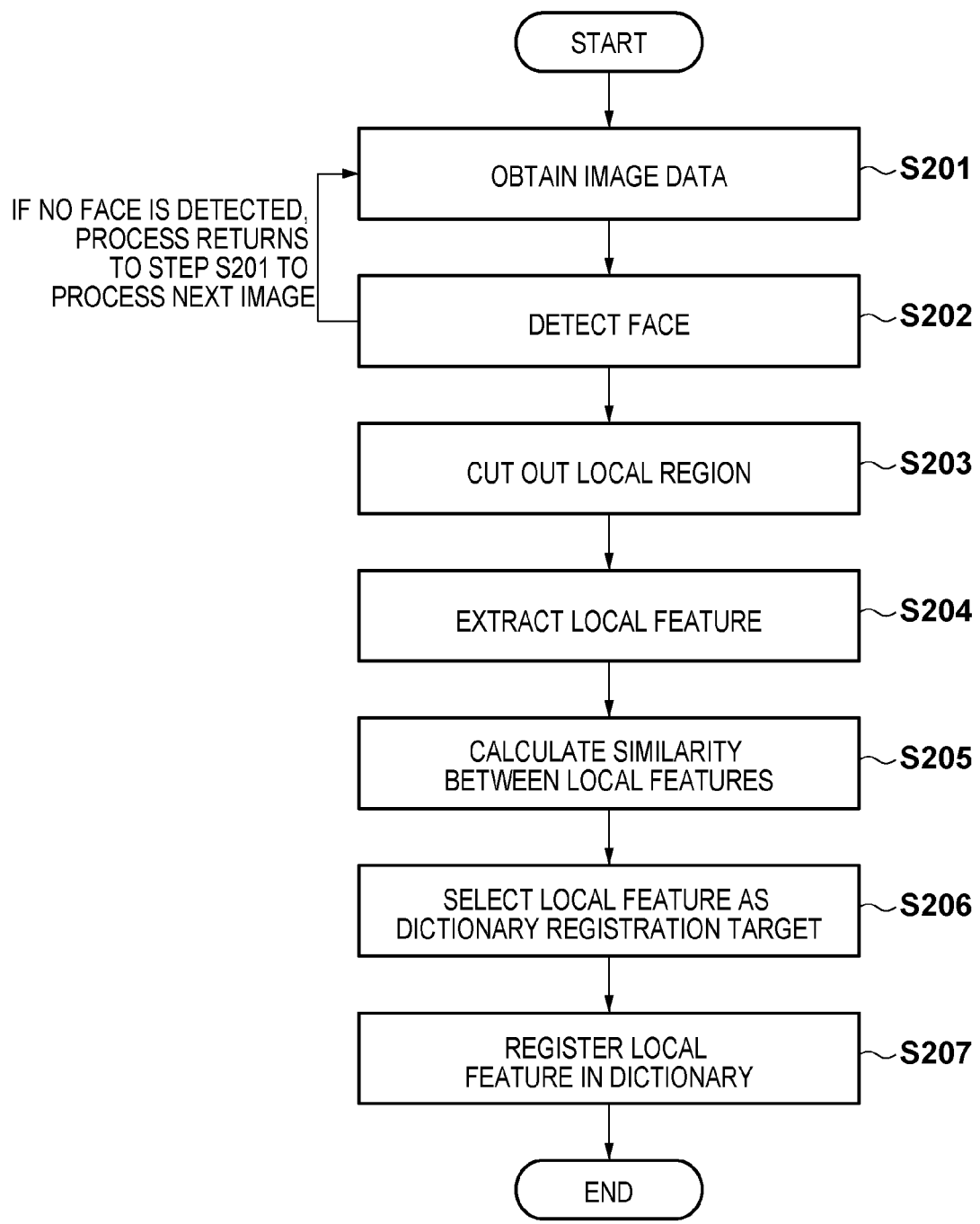
FIG. 2 is a flowchart illustrating the procedure of registration processing.
Figure 3:
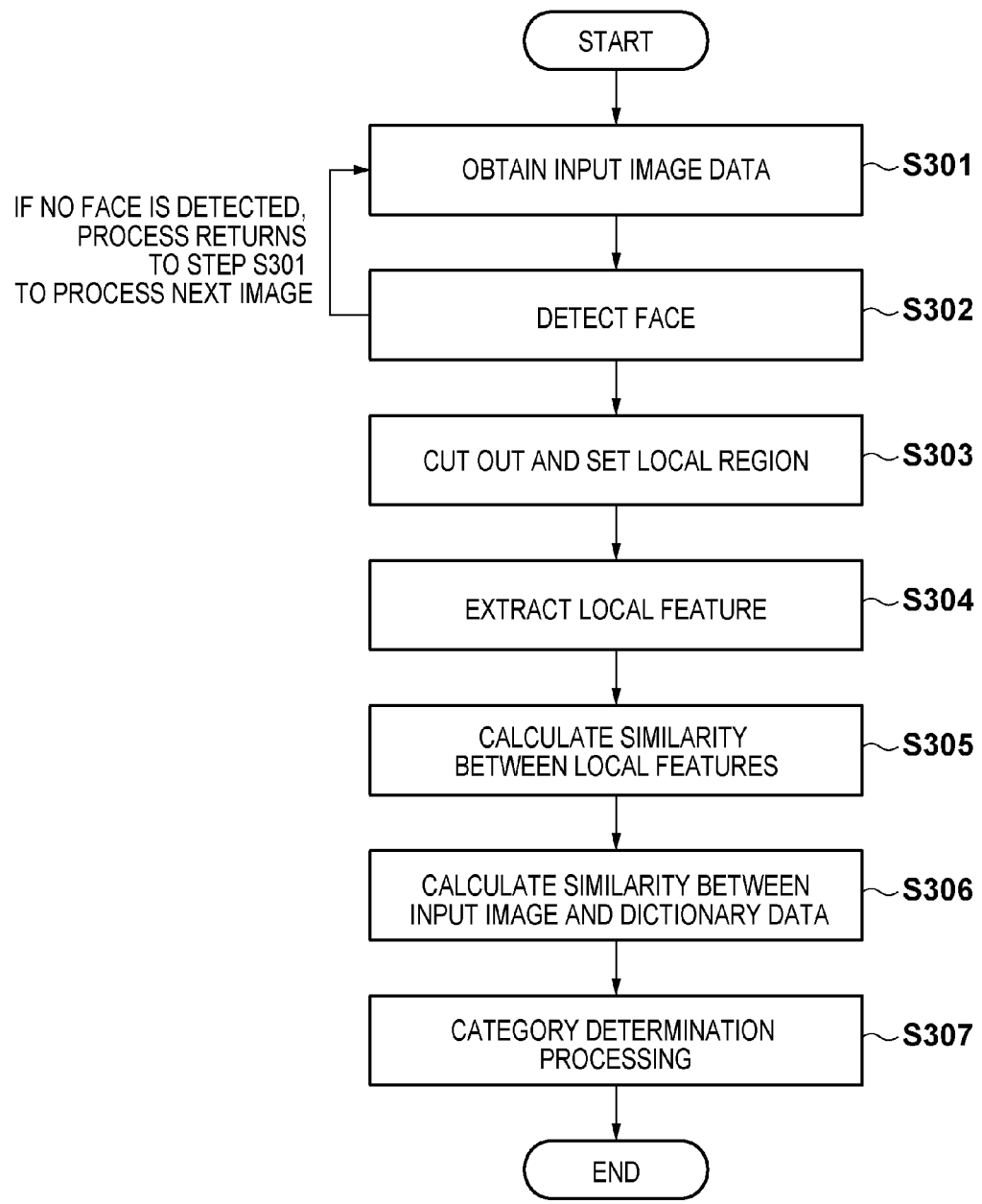
FIG. 3 is a flowchart illustrating the procedure of recognition processing.

The processing procedure of the image recognition apparatus 1 according to this embodiment will be described below with reference to the flowcharts of FIGS. 2 and 3. Registration processing of inputting personal face images from time series images that temporally continue and creating dictionary data will be described first with reference to FIG. 2.

In step S201, the image obtaining unit 10 obtains image data captured by an image capturing unit such as a camera.

In step S202, the face detection unit 20 detects a face image (target object image) from the image data obtained by the image obtaining unit 10. Detection of a personal face from an image can be done using a known technique. When a face is detected, a face region image is obtained. At this time, since the size of the face region changes depending on the distance or angle of the camera at the time of capturing, scaling processing is performed to make the image fit to the input image size assumed for processing of the succeeding stage according to this embodiment. If no face is detected, the process returns to step S201 to obtain the next image. Note that when a face is detected, a face frame detected together with the face image may be displayed on a display (not shown) in a superimposed manner so that the user can designate the registration target face through a user interface (not shown).

Figure 4:
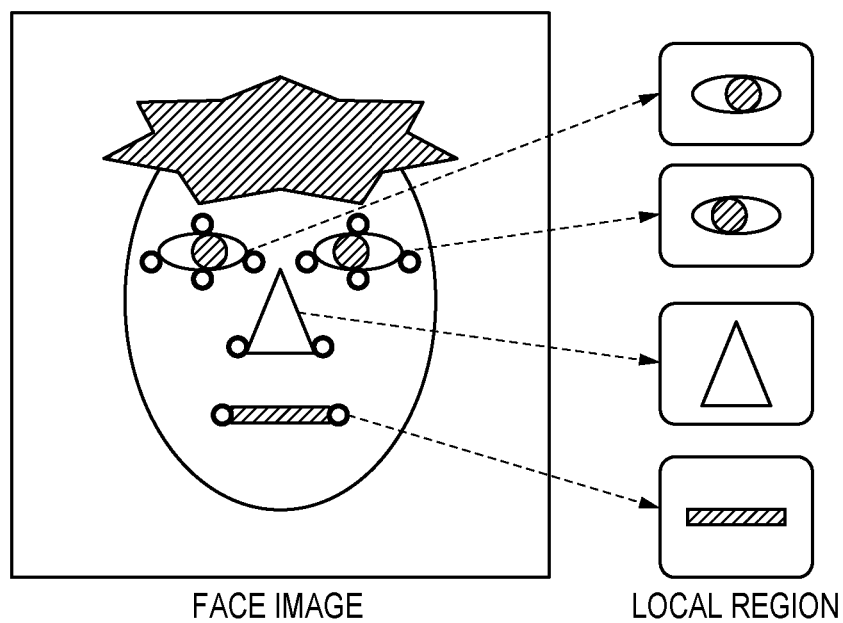
FIG. 4 is a view showing a state in which local regions are cut out from a face image.

In step S203, the local region cutting unit 30 cuts out at least one local region image from the face image data obtained by the face detection unit 20. More specifically, a plurality of feature points are detected from the personal face image, and a predetermined rectangular image is cut out from the face region based on the relative positional relationship to the feature points. FIG. 4 illustrates a state in which local regions are cut out from a face region. As shown in FIG. 4, the endpoints of constituent elements such as the eyes, mouth, and nose are detected as the feature points. These endpoints are selected in advance from parts such as the corners of the left and right eyes, the corners of the mouth, and the nose which are supposed to represent the features of an individual. Each local region image is cut out as an image region of, for example, 5×5 pixels based on the geometrical positional relationship between the endpoints. Note that the whole face image may be cut out as one of the local regions.

In step S204, the local feature extraction unit 40 calculates a feature amount to be used to recognize the face from the local region images cut out by the local region cutting unit 30, and stores the feature amount in the local feature storage unit 50 (feature amount calculation processing). For example, a luminance value is detected from each local region image, and a 25-dimensional feature vector is created from the extracted luminance value as a local feature. A color histogram representing a color feature, a gradient histogram in an edge direction representing an edge, an increment sign, and the like may be extracted. These features are combined to create one feature vector.

The series of processes from image data obtaining in step S201 to local feature extraction processing in step S204 is performed for each frame image of the moving image. However, not all frame images of the moving image need always be processed. For example, to reduce the processing amount, several frames may be excluded from the processing targets so that the processing is performed not for every frames but every two frames, every three frames, or the like. Alternatively, the processing target frame may be determined in accordance with the degree of variation of the face image in the moving image. For example, a frame whose difference from a past processed frame has a predetermined value or more may be determined as a processing target.

Figure 5:
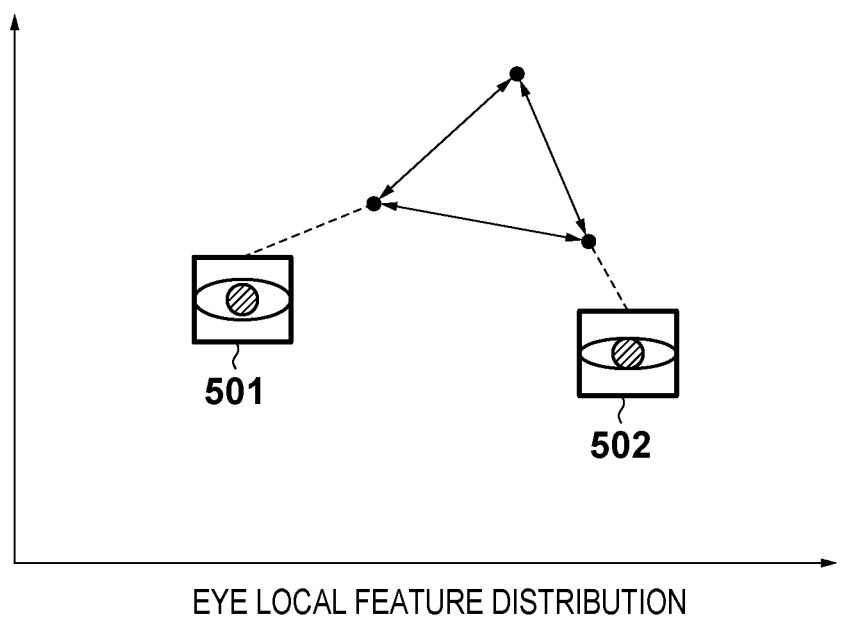
FIG. 5 is a view for explaining similarity calculation between local features.

In step S205, the similarity calculation unit 60 calculates the combination similarities between the plurality of local features existing in the local regions, which are obtained by the local feature extraction unit 40 and stored in the local feature storage unit 50, and stores the similarities in the similarity storage unit 100. A Euclidean distance is used as the scale of the similarity between the local feature amounts. A Mahalanobis distance or the like is also usable. The similarity calculation processing is performed for all local features of the local regions. FIG. 5 schematically shows the similarity calculation processing. In FIG. 5, the local features are plotted on the feature space. More specifically, local features 501 and 502 of the local region (eye region) including the whole eye are plotted on the feature space as shown in FIG. 5. When a Euclidean distance is used as the scale of the similarity, the distance between the plots is obtained as the similarity between the local features. As can be seen, if the local features are similar, the plots are close to each other. If the local features are not similar, the plots are far apart from each other. In this similarity calculation processing, the similarity between the local features is calculated not only in the eye region but also in, for example, the nose region for all combinations in each region.

Figure 7:
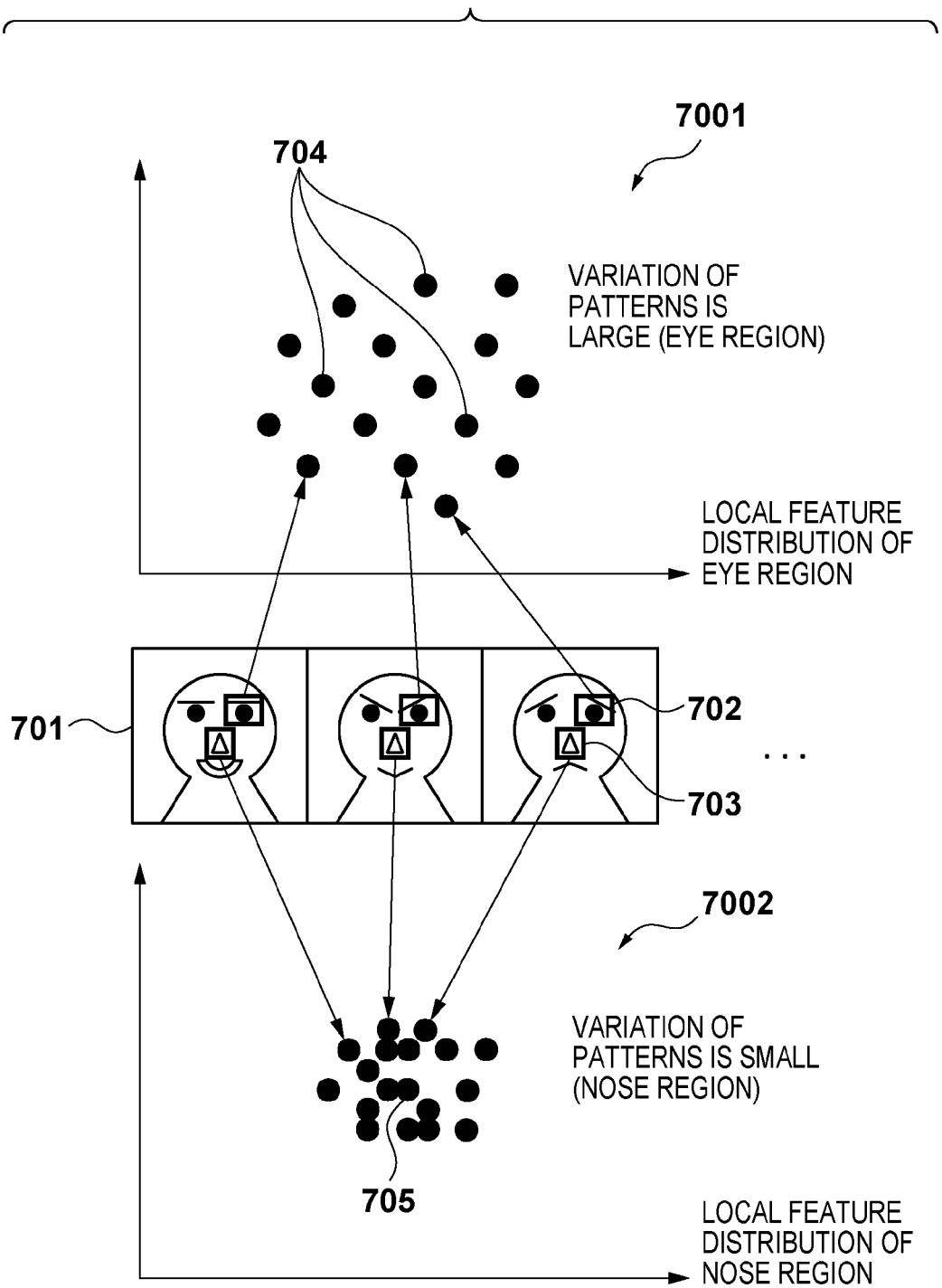
FIG. 7 shows views for explaining a local feature selection result.

In step S206, the local feature selection unit 70 selects a necessary number of local features out of those stored in the local feature storage unit 50 as registration targets based on the similarities calculated by the similarity calculation unit 60 and stored in the similarity storage unit 100. More specifically, for each pair of similar local features, that is, local features having a high similarity, the local feature selection unit 70 excludes one of the local features from the local feature set. FIG. 6 shows conceptual views of local feature selection performed based on the similarity of a pair of local features. In FIG. 6, 6001 represents a distribution of the local features of the local region (eye region) including the whole eye on the feature space. Local features 601 and 602 represent positions of the two eye local features on the feature space. Local feature selection will be explained concerning the two representative local features. The similarity between the two local features falls within a threshold range 603. The similarity is represented by the distance between the two local features. The threshold is a predetermined value. Since the distance between the two local features is equal to or smaller than the threshold, the expressive powers of these patterns can be regarded as almost the same. That the distance between the two local features is equal to or smaller than the threshold is equivalent to that the similarity is equal to or larger than a threshold (the similarity is high). Hence, one of the two local features, in this embodiment, the local feature 602 is excluded from the registration targets. As a result, as indicated by 6002 of FIG. 6, the local feature 602 is removed from the feature space. This processing is repetitively performed for all local features except the local feature 601, thereby generating the local feature distribution as indicated by 6002 of FIG. 6. An effect obtained by executing the above-described local feature selection processing will be described with reference to FIG. 7. FIG. 7 shows the distributions of local features of an image group 701 on the feature space. In FIG. 7, 7001 represents a local feature distribution of the eye region. In FIG. 7, 7002 represents a local feature distribution of the nose region. The image group 701 corresponds to, for example, an image pattern shown in FIG. 8. An image pattern 801 shown in FIG. 8 includes a smiling face pattern, an angry face pattern, and a sad face pattern. Eye regions 702 and nose regions 703 shown in FIG. 7 correspond to eye regions 802 and nose regions 803 shown in FIG. 8. Referring to FIG. 8, the eye region changes between the image patterns. Hence, the eye region local features largely vary on the feature space, as indicated by 7001 of FIG. 7. On the other hand, the nose region rarely changes between the image patterns. Hence, as indicated by 7002 of FIG. 7, the variation of the local feature on the feature space is small, and the number of local features to be registered is redundant. The local feature selection is done in this state. For the eye region, three eye region registration local features 704 cover the recognition range. For the nose region, however, one nose region registration local feature 705 covers the recognition range. Hence, although there are three eye region registration local features, the only one nose region registration local feature suffices. Consequently, since the redundant number of registration patterns of the nose region decreases, the capacity of data stored in the dictionary data storage unit 90 can be decreased. In addition, since similar local features are removed, the data capacity can be decreased without any influence on the recognition accuracy. Finally, the local feature selection unit 70 performs the local feature selection processing for all local regions.

In step S207, the dictionary registration unit 80 registers, in the dictionary data storage unit 90, the local features selected by the local feature selection unit 70. FIG. 9 is a table of dictionary data recorded in the dictionary data storage unit 90. In the data structure of dictionary data 901, the number of local features 902 changes depending on the region. The dictionary data is given a category name. As the category name, a "name unique to a personal face" is given. For example, a personal name or the like is given as the category name. Note that the dictionary registration unit 80 registers the local features selected by the local feature selection unit 70 in the dictionary data storage unit 90 in correspondence with all local regions.

Note that as the category name, an ID number unique to each person may automatically be given. Alternatively, the user may be allowed to register an arbitrary keyword. For example, a question window is displayed on the display (not shown), together with the registration target face, to ask whether to register a unique ID number of an arbitrary keyword. To register an arbitrary keyword, a character input field is displayed so that a character string input there by the user via a user interface (not shown) is registered as the category name. The processing of the flowchart of FIG. 2 thus ends.

In this embodiment, a case in which the dictionary data of the registration target person is not registered has been described. If the dictionary data is already registered, dictionary data may be additionally registered or replaced using local features that can be obtained by the dictionary creation processing of this embodiment.

Note that in the above-described example, an input image is extracted from a moving image. However, another method may be used as long as it obtains the face images of the same person in association with each other. For example, a plurality of photos for a registration target person are input from a personal photo database. The processing of steps S201 to S205 is repeated for the input image group, thereby extracting local feature amounts.

The procedure of face recognition processing to be performed based on dictionary data created in advance by executing the registration processing described with reference to FIG. 2 for an input personal face image will be described next with reference to FIG. 3. Note that the processing will be explained assuming that one face image is input. The processes of steps S301 to S304 of FIG. 3 are the same as those of steps S201 to S204 described in FIG. 2, and a description thereof will be omitted.

In step S305, the similarity calculation unit 60 calculates the similarities between the local features stored in the local feature storage unit 50 and local features of personal dictionary data stored in the dictionary data storage unit 90 by performing the same processing as the registration processing, and stores the similarities in the similarity storage unit 100. This will be described using, for example, the dictionary data shown in FIG. 9. Assume that the category names of the dictionary data are category A and category B. First, for the category A, the similarities between the local features of the eye region, the nose region, and the mouth region of the input image and the corresponding local features of the dictionary data of the category A are obtained. Since the dictionary data has three local features for the eye region, a total of three similarities are obtained for the eye region. In a similar manner, the similarities to the local features of the input image are obtained for the nose region and the mouth region. That is, a total of six similarities are obtained from the local features for the eye region, the nose region, and the mouth region. The obtained similarities are classified by the local region and stored in the similarity storage unit 100 (region similarity calculation processing).

In step S306, the similarity integration unit 110 integrates the similarities of each region calculated by the similarity calculation unit 60 to obtain the object similarities between the input image and the dictionary data (object similarity calculation processing). First, the highest similarity out of the region similarities calculated by the similarity calculation unit 60 for each local region is selected as the representative similarity that represents the local region. The sum of the maximum similarities of the all local regions is obtained and output as the object similarity between the input image and the personal dictionary data. To cope with a face image including a hidden portion or a remarkable expressional change, the sum of the similarities may be obtained for a predetermined number of local regions that have high-ranking similarities, instead of obtaining the sum for all local regions. Alternatively, the sum of similarities that are weighted for the respective regions may be obtained. The above-described processing is performed for the category B and the input image as well.

The processes of steps S305 and S306 described above are repetitively performed as many times as the number of dictionary data of the respective categories in the dictionary data storage unit 90.

In step S307, the category determination unit 120 determines the category of the input image based on the similarity obtained by the similarity integration unit 110. More specifically, the similarities between the input image and the dictionary data obtained for the dictionary data belonging to each category are compared. A category to which the dictionary data having the highest similarity between the input image and the dictionary data belongs is determined as the category to which the input image belongs. However, if the similarity does not exceed a predetermined threshold, a result representing that there is no category corresponding to the input image is output.

An arbitrary threshold can be set for the maximum similarity between the input image and the dictionary data. However, if the set threshold is too large, a result representing that "the input image does not belong to any category" may be output for an input image that should belong to any one of the categories. If the set threshold is too small, a result representing that "the input image belongs to any one of the categories" may be output for an input image that should not belong to any category. The threshold is determined by repeating adjustment in advance or may be changeable. The processing of the flowchart of FIG. 3 thus ends.

In this embodiment, a contrivance to improve the performance of recognition processing is done mainly for the local feature selection unit 70.

As described above, conventionally, when registering a plurality of face images, registration needs to be done for each image to express various variations in the faces. However, according to this embodiment, registration is done for each local region. This makes it possible to reduce the image feature amount to express an image. For example, when registering image information of five images as dictionary data, it is conventionally necessary to register all the five images. According to this embodiment, however, registering only necessary local feature amounts for each local region based on the magnitude of the variation in the local region suffices. Hence, the five local feature amounts need not always be registered for all local regions. This allows to reduce the registered feature amounts and efficiently perform the registration processing. Additionally, even when the registered dictionary data amount is small, high recognition performance can be obtained in the recognition processing. The efficiency of the recognition processing can also be expected to be improved.

For example, when five local feature amounts are registered for each of the local regions as the dictionary data, similarity calculation processing is performed for five local feature amounts extracted from an arbitrary input image. According to this embodiment, however, when three local feature amounts are registered for each local region of the half of all local regions as the information amount that allows to obtain the same recognition performance, and two local feature amounts are registered for each local region of the remaining half, a recognizer having almost the same performance can be generated by ½ the processing amount.

According to the above-described embodiment, it is possible to perform highly accurate recognition even when the registered data amount is small.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-105656 filed on May 10, 2011, which is hereby incorporated by reference herein in its entirety.

What is claimed is:

1. An image recognition apparatus for recognizing a target object in an image by collation with dictionary data, comprising:
    an obtaining unit configured to obtain one or a plurality of images;
    a detection unit configured to detect a target object image from each of one or the plurality of images;
    a cutting unit configured to cut out one or a plurality of local regions from the target object image;
    a feature amount calculation unit configured to calculate, for each of one or the plurality of images, a feature amount from each of one or the plurality of local regions to recognize the target object;
    a similarity calculation unit configured to calculate, for each local region, a similarity between the feature amounts calculated for that region in respective images; and
    a registration unit configured to, for each local region, if there is a pair of feature amounts whose similarity is not less than a threshold in that region, register only one of the pair of feature amounts as dictionary data for the target object.

2. The apparatus according to claim 1, further comprising:
    a region similarity calculation unit configured to calculate, for each of one or the plurality of local regions, a similarity between respective feature amounts registered in the dictionary data and a feature amount calculated, for an input image newly obtained by said obtaining unit, from each of one or the plurality of regions by said feature amount calculation unit to recognize the target object;
    a selection unit configured to select a highest similarity out of the similarities calculated for respective one or the plurality of regions by said region similarity calculation unit, as a representative similarity representing the local region; and
    an object similarity calculation unit configured to calculate a value obtained by integrating the representative similarities selected by said selection unit for all the local regions as an object similarity between the target object in the input image and a target object registered in the dictionary data.

3. The apparatus according to claim 2, further comprising a recognition unit configured to recognize the target object in the input image as a target object registered in the dictionary data when the object similarity calculated by said object similarity calculation unit is not less than a threshold.

4. The apparatus according to claim 1, wherein the one or the plurality of images obtained by said obtaining unit are one or a plurality of frame images included in a moving image.

5. A method of controlling an image recognition apparatus for recognizing a target object in an image by collation with dictionary data, comprising:
- obtaining one or a plurality of images;
- detecting a target object image from each of one or the plurality of images;
- cutting out one or a plurality of local regions from the target object image;
- calculating, for each of one or the plurality of images, a feature amount from each of one or the plurality of local regions to recognize the target object;
- calculating, for each local region, a similarity between the feature amounts calculated for that region in respective images; and
- for each local region, if there is a pair of feature amounts whose similarity is not less than a threshold in that region, registering only one of the feature amounts as dictionary data for the target object.

6. A non-transitory computer-readable storage medium storing a computer program that causes a computer to execute each step of an image recognition apparatus control method of claim 5.

* * * * *